June 25, 1935.  O. A. HJELM  2,006,165
GEARING DEVICE FOR BICYCLES AND THE LIKE
Filed Dec. 22, 1933  3 Sheets-Sheet 1

OSKAR ALGOT HJELM
INVENTOR
BY Haseltine, Lake & Co.
ATTORNEYS

June 25, 1935.  O. A. HJELM  2,006,165
GEARING DEVICE FOR BICYCLES AND THE LIKE
Filed Dec. 22, 1933   3 Sheets-Sheet 2
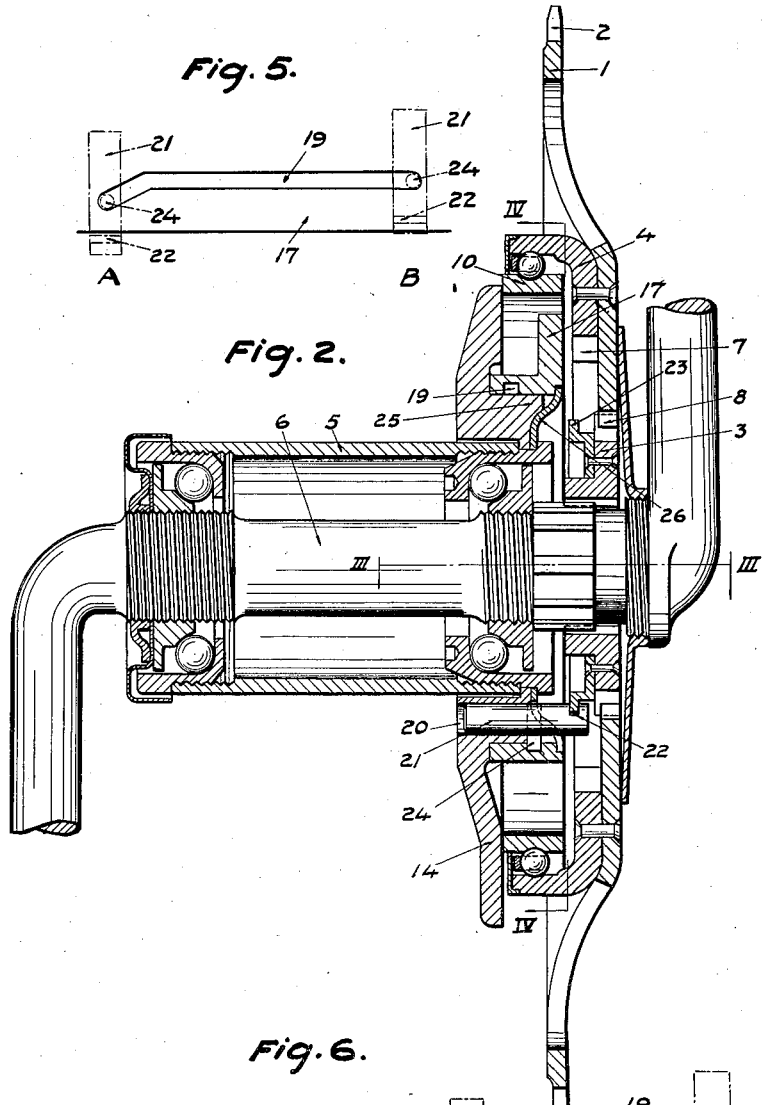
OSKAR ALGOT HJELM
INVENTOR
BY *Haseltine, Lake & Co.*
ATTORNEYS June 25, 1935.    O. A. HJELM    2,006,165
GEARING DEVICE FOR BICYCLES AND THE LIKE
Filed Dec. 22, 1933    3 Sheets-Sheet 3
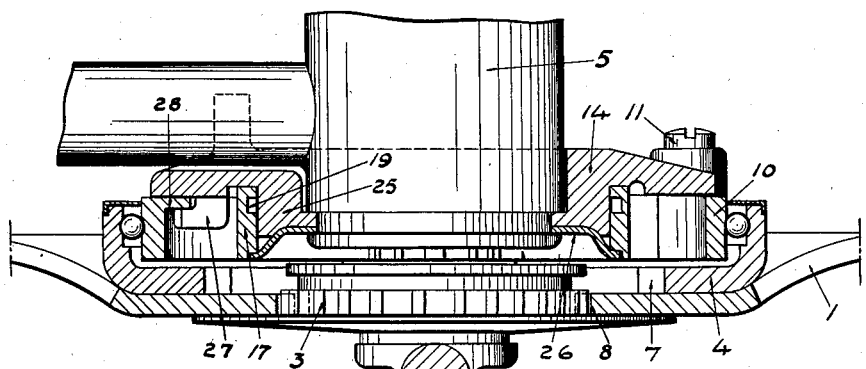
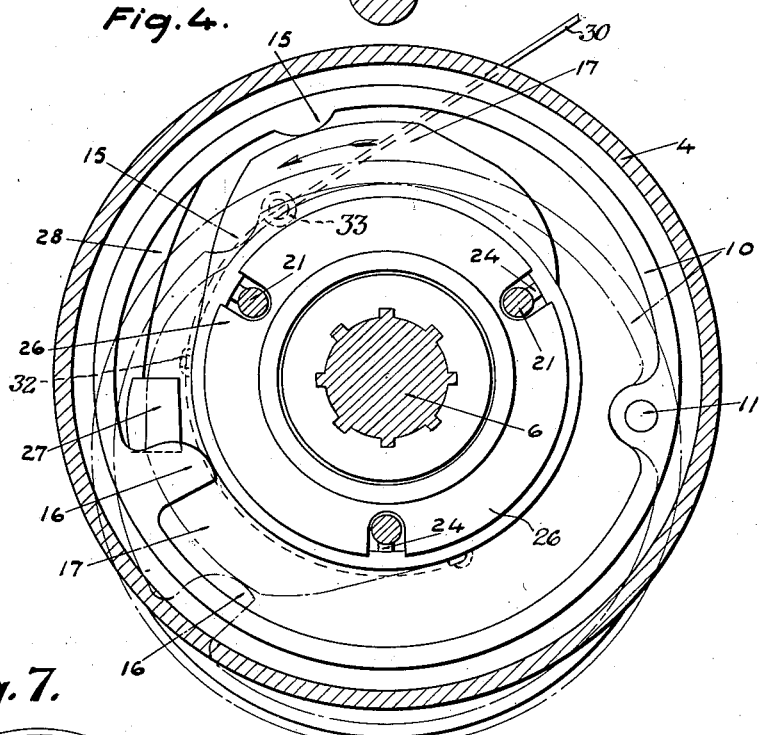
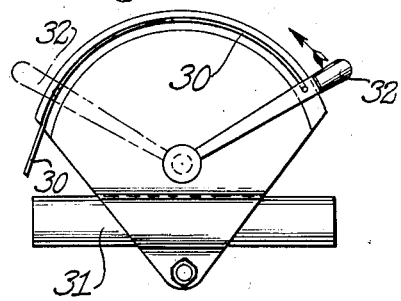
OSKAR ALGOT HJELM
INVENTOR
BY *Haseltine, Lake & Co.*
ATTORNEYS Patented June 25, 1935

2,006,165

UNITED STATES PATENT OFFICE 2,006,165

GEARING DEVICE FOR BICYCLES AND THE LIKE

Oskar Algot Hjelm, Stockholm, Sweden

Application December 22, 1933, Serial No. 703,526
In Sweden December 8, 1932

9 Claims. (Cl. 208—154)

The present invention relates to a simple and practical gear device for bicycles and the like, in which the chain wheel or sprocket is rotatably and adjustably disposed in its plane and relatively to a toothed wheel device located on the crankshaft and rotating with the said shaft and which may be connected or coupled with the chain wheel in such a manner, that alternatively the latter may be driven by means of gear or directly by the pedal shaft. The gear device according to the invention is characterized substantially thereby that the chain wheel and the toothed wheel device, which may be displaced along the crankshaft, are adapted to be brought into engagement with one another, partly by means of a rotary and adjustable eccentric, cam disc or the like, which co-operates with and adjusts the chain wheel, partly by means of gear guiding members, which co-operate with and adjust the toothed wheel device, the cam disc and gear guiding members being adapted to be actuated simultaneously by means of an operating member, which adjusts the chain wheel and the toothed wheel device in positions corresponding to the gear ratio desired and to direct driving respectively. By the present gearing device, which is very strong, without necessarily being heavy and bulky, and which may be installed on already existing bicycles, which are in use, as well as on new bicycles, it is possible to change the gear ratio between the crank-shaft and the driving wheel, without it being necessary for that purpose to shift the chain wheel over to other toothed or chain wheels, as has often been necessary hitherto in gear devices of the kind in question.

Also all injurious or excessive stresses on the chain caused by the gear devices known hitherto are eliminated, the chain being in the present invention in continuous engagement with the chain wheels on the pedal and driving shafts. By means of an operating member, which may preferably be actuated from the handle bars it is thus possible by the invention by a simple manipulation by hand and without difficulty while riding the bicycle to adjust the chain wheel and the displaceable toothed wheels in positions corresponding to the gear ratio desired and to direct driving respectively.

An embodiment of the invention is illustrated in the accompanying drawings, in which Figure 1 shows a side view of the chain wheel with the crank shaft in section.

Figure 2 shows a section taken on line II—II of Figure 1.

Figure 3 shows a section taken along line III—III of Figure 2 and

Figure 4 is a section taken on line IV—IV of Figure 2.

Figure 5 shows a detail and

Figure 6 shows a modification of the same detail.

Figure 7 shows another detail.

Figure 1:
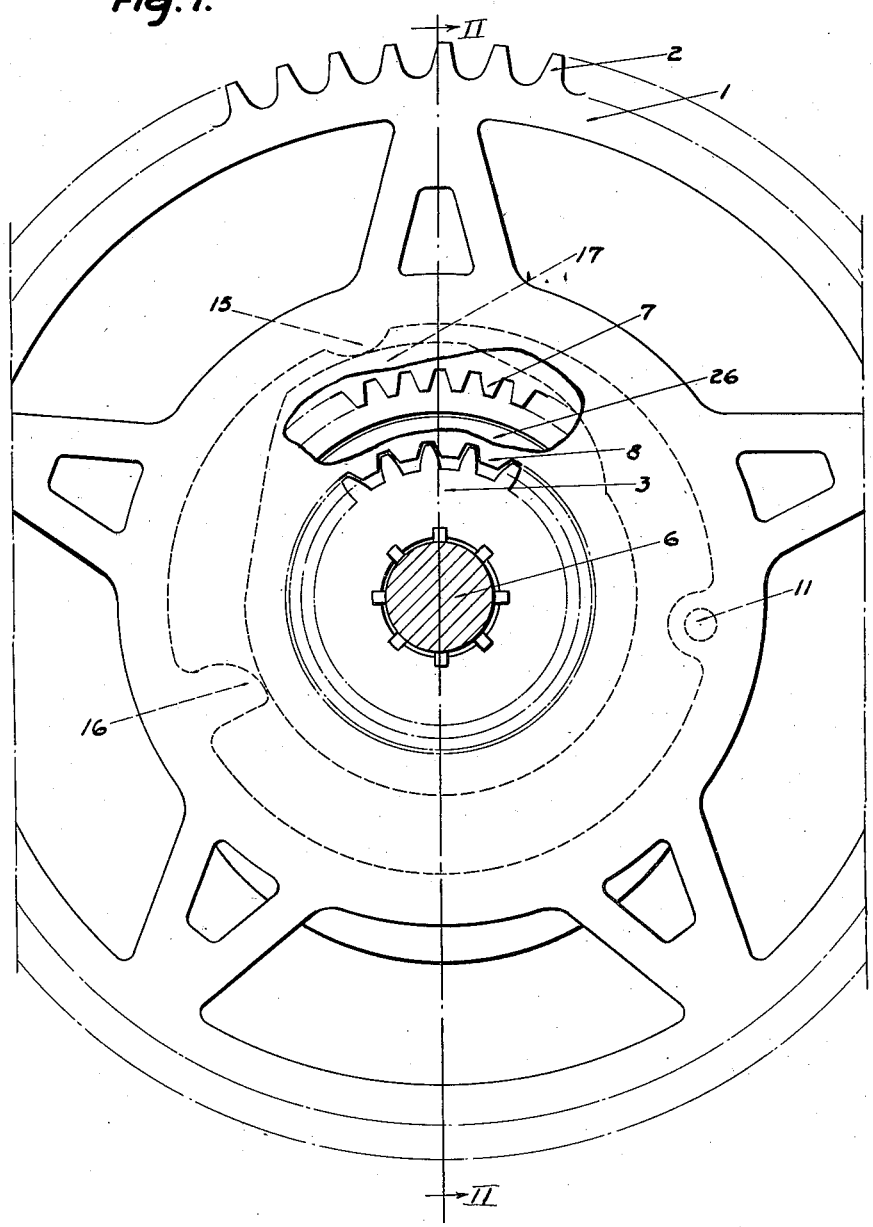

In the drawings numeral 1 indicates the chain wheel, 2 its outer toothed rim, 6 the crank shaft, which is rotatably mounted in the case 5 of the crank shaft bearing and 3 the toothed wheel device which rotates with the said shaft, the said toothed wheel device consisting of a single toothed wheel in the embodiment shown.

The chain wheel 1 is provided with two inner toothed rims 7, 8, the toothed rim 7 being formed from a special portion 4, which is rigidly connected with the chain wheel. The said portion is rotatably mounted on a ring 10, which by means of a bolt 11 is pivotally connected with a frame plate 14 secured to the case of the crank shaft bearing. From the said plate there is formed an L-shaped shoulder 27, which serves as a guiding means for a flange 28 formed from the ring 10. The toothed rims 7, 8, which have different diameters, are adapted to be brought into engagement with the toothed wheel 3, which wheel is displaceably but not rotatably disposed on the crank shaft 6. The carrying portion 10 is provided with two projections 15, 16. An eccentric or cam disc 17, which is mounted on a hub 25 formed from the frame plate 14, co-operates with the said projections, the cam disc being retained on the said hub by means of a plate 26. By turning and adjusting the eccentric 17 which is semirotary the portion 10 and together with it the chain wheel 1 and the portion 4 respectively may thus be moved in the plane of the chain wheel and be adjusted into various positions relatively to the crank shaft 6.

The eccentric 17 is formed with three grooves 19 extending obliquely inwards. The shape of the said grooves is shown more clearly in Figure 5, where one of the grooves is imagined to be spread in plane. Further, there are three recesses 20 provided in the frame plate 14, in each of which a pin 21 is displaceably disposed. Each of the said pins is provided with a recess 22, into which an annular flange 23 grasps, which is shaped from a plate connected with the side of the toothed wheel 3, which faces the crank case bearing.

Further each pin 21 is provided with a projection 24, which engages the respective groove 19.

On account thereof the respective pin 21 and also the toothed wheel 3 will be displaced in one direction or the other, when the eccentric is turned in one direction or the other. The smaller toothed rim, which is indicated by 8, has the same diameter as the toothed wheel 3, and is adapted for engagement with the said toothed wheel to put the chain wheel in direct connection with the crank shaft.

To actuate the semi-rotary eccentric 17, through the turning of which a simultaneous adjustment of the ring 10 and the chain wheel respectively and the toothed wheel 3 is obtained in the embodiment shown, preferably a flexible member, for instance a piano wire 30 or the like, may be secured by its one end to the cam disc 17. The other end of the flexible member is preferably led up to the handle bars 31, where the said end is connected to a pivotally mounted lever 32 serving to adjust and to change the cam disc. The parts 30 to 32, inclusive, are conventional and do not form part of this invention.

When the parts assume the positions shown in Figures 1-4, the chain wheel 1 is in direct connection with the crank shaft 6 by the toothed wheel 3. At this the respective projection 24 in the respective groove 19 assumes the position indicated by A and shown in dash-and-dot-lines in Figure 5, and the toothed wheel 3 is kept in engagement with the toothed rim 8 of the chain wheel 1. By the eccentric 17 the chain wheel 1 is kept centrally relatively to the crank shaft 6. If, however, in an ascent this direct driving would become too tiring and one would wish to use the lower speed, the eccentric 17 should be turned to the position shown in dash-and-dot-lines in Figure 4. At this the pin 24 is caused to assume the position indicated by B and shown in dash-and-dot-lines in Figure 5, and the ring 10 and the chain wheel 1 respectively are caused to assume the position shown in dash-and-dot-lines in Figure 4. At this the eccentric has lowered and retains the chain wheel in such position that its toothed rim 7 is in engagement with the toothed wheel 3, the said latter wheel being retained in the said engagement by the gear guiding means 21.

If the chain wheel has three toothed rims with different diameters instead of two toothed rims the respective groove 19 should have the shape shown in Figure 6. If the conditions make it necessary in such cases to use a still lower speed the eccentric and the pin 24 respectively may by further turning be caused to assume the position shown in dash-and-dot-lines in Figure 6 and indicated by C, the eccentric having lowered the ring 10 and the chain wheel respectively further past the position shown in Figure 4 and the eccentric retains the chain wheel in such position that the toothed rim, which has the largest diameter, is in engagement with the toothed wheel 3, which latter wheel is retained in the said engagement by the gear guiding means 21. When the gear need not be used any longer, the eccentric 17 is turned back to the initial position, the chain wheel 1 being put in direct connection again with the crank shaft 6.

Having now described my invention, what I claim as new and desire to secure by Letters Patent is:

1. A change speed chain and sprocket drive for a bicycle or the like, comprising the combination, with a pedal shaft rotatably mounted in bearings upon said bicycle, of an axially shiftable gear upon said pedal shaft positively rotated by the shaft, a chain sprocket surrounding said pedal shaft and being rotatable and eccentrically displaceable in its own plane, at least two different gear means rigid with said chain sprocket individually adapted to be brought into mesh with said axially shiftable gear, a semi-rotary cam member surrounding said pedal shaft and effective in one position of partial rotation to dispose one of said two gear means in initial position to mesh with said axially shiftable gear and in another partly rotated position effective to dispose the other of said two gear means initially in position to mesh with said axially shiftable gear, and means for simultaneously shifting said axially shiftable gear into proper position with respect to either one of said two gear means while rotating said cam member partially to the correspondingly proper position to cause the meshing of the gear means with the shiftable gear which is shifted to mesh.

2. A drive according to claim 1, wherein the chain sprocket is rotatably mounted upon an annular member which is shiftable eccentrically with respect to the pedal shaft and provided with means co-operating with the cam member in order to render said annular member shiftable by means of said cam member by partially rotating the latter.

3. A drive according to claim 1, wherein the chain sprocket is rotatable on an eccentrically shiftable member which is shifted by means of the cam member upon partial rotation of the same, and said cam member is rotatably mounted on the exterior of one of the bearings of the pedal shaft.

4. A drive according to claim 1, wherein means for axially shifting the axially shiftable gear includes guide means for said gear provided with projections extending into grooves in said cam member, which projections are moved by the grooves upon partial rotation of said cam member so as to move said guide means in an axial direction with respect to the pedal shaft and thereby axially shift the axially shiftable gear.

5. A drive according to claim 1, wherein the means for axially shifting the axially shiftable gear comprises a flange upon the gear, at least one guide member having a portion engaging said flange and having a projection extending into a groove obliquely disposed in the cam member with respect to the axis of the pedal shaft, which cam, upon partial rotation, is effective by means of said groove and the projection extending into the same to shift said flange through the portion of said guide member engaging the same and also thereby effective to shift said axially shiftable gear.

6. A drive according to claim 1, wherein means for axially shifting the axially shiftable gear comprise a frame plate fixed upon the bicycle and provided with a plurality of guide members which are displaceable in directions parallel with the axis of the pedal shaft and provided individually with projections extending into grooves in the cam member having oblique portions for shifting said projections and thereby said guide members in parallelism with said pedal shaft upon partial rotation of said cam member, and means upon said axially shiftable gear continuously engaged by portions of said guide members in order to shift said axially shiftable gear by means of said guide members when said cam member is operated.

7. A drive according to claim 1, wherein means for axially shifting the axially shiftable gear comprises guide means displaceably disposed in the cam member and having projections extending into grooves obliquely disposed in a fixed portion of the bicycle with respect to the pedal shaft, in order that upon partial rotation of said cam member the grooves will cause the projections and thereby the guide members to be displaced in direction parallel with the axis of said pedal shaft, and means upon said guide members shifting said axially shiftable gear with said guide members, upon displacement of the latter.

8. A drive according to claim 1, wherein one of the gear means associated with the chain sprocket is substantially of the same diameter as the axially shiftable gear, so that when said latter gear is brought into mesh therewith, the chain sprocket is directly connected to the pedal shaft and is rotated directly thereby, while the other gear means has a greater diameter so as to serve as reducing gear when in mesh with the axially shiftable gear.

9. A drive according to claim 1, wherein one of the gear means associated with the chain sprocket is substantially of the same diameter as the axially shiftable gear, so that when the latter is brought into mesh therewith, the chain sprocket is directly driven by the pedal shaft and rotated at the same speed therewith, while the other one or more gear means are of such different diameters as to cause rotation of the chain sprocket at different speeds than the pedal shaft when said other gear means are individually brought into mesh with said axially shiftable gear.

OSKAR ALGOT HJELM.